(12) United States Patent
Haskin

(10) Patent No.: US 9,745,860 B1
(45) Date of Patent: Aug. 29, 2017

(54) POWER TRANSMISSION SYSTEM FOR TURBINE OR COMPRESSOR HAVING COUNTER-ROTATING BLADES

(71) Applicant: Jay Haskin, Bryan, TX (US)

(72) Inventor: Jay Haskin, Bryan, TX (US)

(*) Notice: Subject to any disclaimer, the term of this patent is extended or adjusted under 35 U.S.C. 154(b) by 0 days.

(21) Appl. No.: 15/341,628

(22) Filed: Nov. 2, 2016

(51) Int. Cl.
| | | |
|---|---|---|
| *F01D 15/12* | (2006.01) | |
| *F04D 29/053* | (2006.01) | |
| *F04D 29/051* | (2006.01) | |
| *F04D 29/056* | (2006.01) | |
| *F04D 29/32* | (2006.01) | |
| *F04D 25/02* | (2006.01) | |
| *F01D 5/02* | (2006.01) | |
| *F01D 25/16* | (2006.01) | |

(52) U.S. Cl.
CPC ............... *F01D 15/12* (2013.01); *F01D 5/02* (2013.01); *F01D 25/162* (2013.01); *F04D 25/028* (2013.01); *F04D 29/051* (2013.01); *F04D 29/053* (2013.01); *F04D 29/056* (2013.01); *F04D 29/321* (2013.01); *F05D 2220/32* (2013.01); *F05D 2240/52* (2013.01); *F05D 2240/60* (2013.01); *F05D 2260/40311* (2013.01)

(58) Field of Classification Search
CPC .......... F01D 15/12; F01D 5/02; F01D 25/162; F04D 25/028; F04D 29/056
See application file for complete search history.

(56) References Cited

U.S. PATENT DOCUMENTS

| | | | | |
|---|---|---|---|---|
| 3,524,318 A | * | 8/1970 | Bouiller | F02C 3/067 415/60 |
| 3,673,802 A | * | 7/1972 | Krebs | F02C 3/067 415/79 |
| 4,259,624 A | * | 3/1981 | Seibicke | B60S 1/08 318/282 |
| 4,555,218 A | * | 11/1985 | Jonsson | F03B 17/062 416/119 |
| 4,648,788 A | * | 3/1987 | Jochum | B63H 1/16 415/124.1 |
| 4,790,133 A | * | 12/1988 | Stuart | F02K 3/072 415/65 |
| 4,860,537 A | * | 8/1989 | Taylor | F02C 3/067 415/65 |
| 4,969,325 A | * | 11/1990 | Adamson | F02C 3/067 416/129 |
| 6,127,739 A | * | 10/2000 | Appa | F01D 1/26 290/42 |

(Continued)

*Primary Examiner* — David M Fenstermacher
(74) *Attorney, Agent, or Firm* — Egbert Law Offices, PLLC

(57) ABSTRACT

A power transmission apparatus has a housing, a first shaft rotatably mounted within the housing, a second shaft rotatably mounted within the housing and extending around at least a portion of the first shaft, a third shaft exterior of the first and second shafts and positioned within the housing, a first transmission connected to the second shaft and to the third shaft such that a rotation of the second shaft causes a rotation of the third shaft, a second transmission connected to the first shaft and to the third shaft such that a rotation of the first shaft applies rotational energy to the third shaft, and a power receiver connected to the third shaft so as to convert the rotational energy of the third shaft into energy or motion.

20 Claims, 7 Drawing Sheets

(56) References Cited

U.S. PATENT DOCUMENTS

| | | | | |
|---|---|---|---|---|
| 6,278,197 B1* | 8/2001 | Appa | ............... | F03D 1/025 |
| | | | | 290/54 |
| 7,195,446 B2* | 3/2007 | Seda | ............... | F01D 1/24 |
| | | | | 415/229 |
| 7,290,386 B2* | 11/2007 | Orlando | ............... | F01D 1/26 |
| | | | | 415/65 |
| 7,451,592 B2* | 11/2008 | Taylor | ............... | F01D 1/26 |
| | | | | 60/268 |
| 8,075,438 B2* | 12/2011 | Vetters | ............... | B64C 11/48 |
| | | | | 475/248 |
| 8,393,853 B2* | 3/2013 | Sauer | ............... | F03B 13/264 |
| | | | | 415/72 |
| 8,534,074 B2* | 9/2013 | Copeland | ............... | F02C 7/277 |
| | | | | 60/226.1 |
| 8,747,055 B2* | 6/2014 | McCune | ............... | F02K 3/06 |
| | | | | 415/122.1 |
| 8,876,462 B2* | 11/2014 | Balk | ............... | B64C 11/48 |
| | | | | 415/69 |
| 8,956,108 B2* | 2/2015 | Eleftheriou | ............... | F02K 3/06 |
| | | | | 415/122.1 |
| 9,410,430 B2* | 8/2016 | Haskin | ............... | F01D 1/24 |
| 2006/0090451 A1* | 5/2006 | Moniz | ............... | F01D 1/24 |
| | | | | 60/226.1 |
| 2011/0000222 A1* | 1/2011 | Black | ............... | F02C 7/20 |
| | | | | 60/796 |
| 2012/0049523 A1* | 3/2012 | Bersiek | ............... | F03D 1/025 |
| | | | | 290/44 |
| 2013/0219859 A1* | 8/2013 | Suciu | ............... | F02C 3/113 |
| | | | | 60/268 |
| 2013/0223993 A1* | 8/2013 | Merry | ............... | F01D 1/24 |
| | | | | 415/122.1 |
| 2013/0230380 A1* | 9/2013 | Allouche | ............... | F01D 5/03 |
| | | | | 415/1 |

* cited by examiner

POWER TRANSMISSION SYSTEM FOR TURBINE OR COMPRESSOR HAVING COUNTER-ROTATING BLADES

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to power transmission apparatus. More particularly, the present invention relates to power transmission systems as used with turbines or compressors having counter-rotating blades.

2. Description of Related Art Including Information Disclosed Under 37 CFR 1.97 And 37 CFR 1.98.

A steam turbine is a device that extracts thermal energy from pressurized steam and uses it to do mechanical work on a rotating output shaft. Because the turbine generates rotary motion, it is particularly suited to be used to drive an electrical generator. Approximately 90% of all electrical generation in the United States is by the use of steam turbines. The steam turbine is a form of heat engine that derives much of its improvement in thermodynamic efficiency from the use of multiple stages in the expansion of the steam. Steam turbines are made in a variety of sizes ranging from small (i.e. less than 0.75 kW) to approximately 1,500,000 kW. The small units are used as mechanical drives for pumps, compressors and other shaft-driven equipment. Large turbines are used to generate electricity.

Turbine blades are of two basic types, blades and nozzles. Blades move entirely due to the impact of steam on them. Their profiles do not converge. This results in a steam velocity drop and essentially no pressure drop as steam moves through the blades. A turbine composed of blades alternating with fixed nozzles is called an impulse turbine, a Curtis turbine, a Rateau turbine, or a Brown-Curtis turbine. Nozzles appear similar to blades, but their profiles converge near the exit. This results in a steam pressure drop and velocity increase as steam moves through the nozzles. Nozzles move due to both the impact of steam on them and the reaction due to the high-velocity steam at the exit. A turbine composed of moving nozzles alternating with fixed nozzles is called a reaction turbine or a Parsons turbine.

Except for low-power applications, turbine blades are arranged in multiple stages in series, called compounding, which greatly improves efficiency at low speeds. A reaction stage is a row of fixed nozzles followed by a row of moving nozzles. Multiple reaction stages divide the pressure drop between the steam inlet and exhaust. Numerous small drops result in a pressure-compounded turbine. Impulse stages may be either pressure-compounded, velocity-compounded, or pressure-velocity compounded. A pressure-compounded impulse stage is a row of fixed nozzles followed by row of moving blades, with multiple stages for compounding. A velocity-compounded impulse stage is a row of fixed nozzles followed by two or more rows of moving blades alternating with rows of fixed blades. This divides the velocity drop across the stage into several smaller drops.

Condensing turbines are most commonly found in electrical power plants. These turbines exhaust steam from a boiler in a partially condensed state at a pressure well below atmospheric to a condenser. Non-condensing or back pressure turbines were most widely used for process steam applications. The exhaust pressure is controlled by a regulating valve to suit the needs of the process steam pressure. These are commonly found at refineries, district heating units, pulp and paper plants, and desalination facilities where large amounts of low-pressure process steam are needed. Reheat turbines are also almost used exclusively in electrical power plants. In a reheat turbine, steam flow exits from a high-pressure section of the turbine and is returned to the boiler where additional superheat is added. The steam goes back into an intermediate pressure section of the turbine and continues its expansion. Using reheat in a cycle increases the work output from the turbine and also the expansion reaches conclusion before the steam condenses. As such, this minimizes the erosion of the blades in the last rows. Extracting-type turbines are common in various applications. In an extracting-type turbine, steam is released from the various stages of the turbine and used for industrial process needs or sent to boiler feedwater heaters to improve overall cycle effect efficiency. Induction turbines introduce low-pressure steam at an intermediate stage to produce additional power.

A gas compressor is a mechanical device that increases the pressure of the gas by reducing its volume. Compressors are similar to pumps. Both increase the pressure on a fluid and both can transport the fluid through a pipe. Since gases are compressible, the compressor also reduces the volume of the gas. Axial-flow compressors are dynamic rotating compressors that use arrays of fan-like airfoils to progressively compress the working fluid. The arrays of airfoils are set in rows, usually as pairs, one rotating and one stationary. The rotating airfoils, also known as blades or rotors, accelerate the fluid. The stationary airfoils, also known as stators or vanes, decelerate and redirect the flow direction of the fluid preparing it for the rotor blades at the next stage. Axial compressors are almost always multi-stage, but the cross-sectional area of the gas passage diminishes along the compressor to maintain an optimal axial Mach number.

In such turbines, a fluid stream, under pressure, impinges on a set of blades (or buckets) connected to a central shaft to produce work. This results in changes in the angular velocity of the fluid stream. These changes in an angular velocity serve to strike the next set of blades connected to the shaft in the most efficient manner. There is an intermediate set of blades which are set at a different angle to realign the flow so as to impinge upon the next set of working blades at the most efficient angle. The set of intermediate blades in most equipment is currently fixed to the stationary element. This process uses approximately 40% of the working fluid energy without producing any work.

In the past, various patents and patent publications have issued relating to such turbines. For example, U.S. Pat. No. 4,648,788, issued on Mar. 10, 1987 to P. Jochum, describes a device and a fluid pressure generator that includes an annular casing which is peripherally mounted and driven in a through-flow channel. The interface of the annular casing forms part of the wall of the through-flow channel. The annular casing is provided with a number of propeller blades which extend radially inwardly into the through-flow channel and which are rotationally mounted on their individual pin shafts by means of which the magnitude of the thrust may be altered in a continuous manner and the direction of the operation of the thrust can be reset.

U.S. Pat. No. 4,969,325, issued on Nov. 13, 1992 Adamson et al., shows a turbofan engine having a counter-rotating partially-geared fan drive turbine. This turbofan engine has a fan section, a booster compressor disposed aft of the fan section relative to the flow of combustion gases through the engine, and a core section disposed aft the booster compressor. A low-pressure counterrotating turbine, disposed aft the core section, is used for driving the fans section and the booster compressor. The counterrotating turbine includes at least one set of rotating turbine blades and at least one set of oppositely rotating counterrotating turbine blades. A twin spool shaft is provided for coupling the turbine blades to the booster compressor and for coupling the counterrotating turbine blades to the fans section.

U.S. Pat. No. 6,278,197, issued on Aug. 21, 2001 the K. Appa, discloses a contra-rotating wind turbine system. A hub assembly is provided having inner and outer coaxial shafts telescopically related but radially spaced to permit independent rotation about a generally horizontal axis. A first set of rotor blades is mounted on the inner shaft at a plurality of circumferentially-spaced locations. The rotor blades extend radially away from the axis of rotation and positioned on the inner shaft for rotating the inner shaft in a first direction about the axis of rotation when subjected to wind-induced airflow. A second set of rotor blades is similarly mounted on the outer shaft axially spaced from the first set of rotor blades for rotating the outer shaft about the axis of rotation in an opposite direction.

U.S. Pat. No. 7,195,446, issued a Mar. 27, 2007 to Seda et al., provides a counter-rotating turbine engine that provides a low-pressure turbine inner rotor configured to rotate in a first direction and a low-pressure turbine outer rotor configured to rotate in a second direction that is opposite to the first rotational direction. At least one foil bearing is coupled to at least one of the inner and outer rotors so as to improve clearance control between a first rotating component and at least one of a second rotating component and a non-rotating component.

U.S. Pat. No. 7,290,386, issued on Nov. 6, 2007 to Orlando et al., teaches a counter-rotating gas turbine engine. A low-pressure turbine inner rotor includes a first plurality of turbine blade rows configured to rotate in a first direction and a low-pressure turbine outer rotor rotatably coupled to the inner rotor. The outer rotor includes a second plurality of turbine blade rows that are configured to rotate in a second direction that is opposite the first rotational direction of the inner rotor such that at least one of the second plurality of turbine blade rows is coupled axially forward of the first plurality of turbine blade rows.

U.S. Pat. No. 7,451,592, issued on Nov. 18, 2008 to Taylor et al., teaches a counter-rotating turbine engine which includes a gearbox. The turbine engine arrangement is provided with contra-rotating shafts and a gearbox which is also coupled to a shaft. The relative rotational speed ratio between the shafts can be determined with a first low-pressure turbine secured to the first shaft arranged to rotate at a lower speed but provide high work whilst a second low-pressure turbine secured to the second shaft rotates at a higher speed governed by the gearbox.

U.S. Pat. No. 8,393,853, issued on Mar. 12, 2013 to Sauer et al., provides a high-efficiency turbine and method of generating power. The turbine includes a plurality of blades that rotate in a single direction when exposed to a fluid flow. The plurality of blades are joined to the central shaft by a plurality of radial spokes disposed substantially perpendicular to the central shaft such that the rotating plurality of blades causes the shaft to rotate.

U.S. Patent Publication No. 2012/0049523, published on Mar. 1, 2012 to S. A. Bersiek, describes a wind jet turbine with fan blades located on an inner and outer surface of the cylinder so as to allow wind or liquid to pass through the inner and outer blades. The wind jet turbine has a first set of fan blades, a plurality of magnets that each has a magnetic field, a cylinder having an inside and outside surface that supports the first set of fan blades on the inside surface and coupled to the plurality of magnets, and at least one cable winding located apart from the magnets. The rotation of the cylinder results in the movement of the magnetic field across at least one cable winding.

U.S. Patent Publication No. 2013/0219859, published in Aug. 29, 2013 to Suciu et al., provides a counter-rotating low-pressure compressor and turbine. The compressor section includes a counter-rotating low-pressure compressor that includes outer and inner compressor blades interspersed with one another and configured to rotate in opposite directions to one another about an axis of rotation. A transmission couples at least one of the outer and inner compressor blades to a shaft. The turbine section includes a counter-rotating low-pressure turbine having an outer rotor that includes an outer set of turbine blades. An inner rotor has an inner set of turbine blades interspersed with the outer set of turbine blades. The outer rotor is configured to rotate in an opposite direction about the axis of rotation from the inner rotor. A gear system couples at least one of the outer and inner rotors to the shaft.

U.S. Patent Publication No. 2013/0230380, published on Sep. 5, 2013 to Allouche et al., discloses a rotating housing turbine. The housing has a side wall. The turbine blades are attached to the side wall. The turbine is completely open in the center so as to allow a space for solids and debris to be directed out of the turbine without jamming the spinning blades/side wall.

U.S. Pat. No. 3,524,318, issued on Aug. 18, 1970 shows a gas turbine power plant having an axial-flow compressor. This axial flow compressor includes counter-rotating rotors.

U.S. Pat. No. 3,673,802, issued on Jul. 4, 1972 to Krebs et al., describes a fan engine with a counter-rotating geared core booster. The compressor has a pair of counter-rotating elements, a rotating duct which carries fan blades on the exterior surface, and compressor blades on the interior surface. A conventional compressor rotor rotates in a direction counter to the direction of the rotation of the rotating duct. Alternative gearing schemes are shown for coupling the rotation of the fan to the rotation of the low-pressure compressor.

U.S. Pat. No. 4,159,624, nation of Jul. 3, 1979 to G. P. Gruner, describes a gas turbine power plant that has a compressor stage and a turbine stage with an annular combustion stage therebetween. Each of the counter-rotating compressor rotors is connected to one of the counter-rotatable turbine rotors by an elongated hollow cylindrical shaft concentric with an axially extending fixed shaft to form an integral unit. The units are operably connected by differential gearing mounted on the fixed shaft.

U.S. Pat. No. 4,790,133, issued on Dec. 13, 1988 to A. R. Stuart, shows a counter-rotating turbo fan engine. This engine has a core gas generator for generating combustion gases, a power turbine, a fan section, and a booster. The power turbine includes first and second counter rotating turbine blade rows effective for rotating first and second driveshafts, respectively. The fan section includes a first fan blade row connected to the first driveshaft and a second fan blade row connected to the second driveshaft.

U.S. Pat. No. 4,860,537, issued on Aug. 29, 1989 to J. B. Taylor, describes a counter rotating gearless front fan engine for generating combustion gases. The power turbine includes a pair of counter-rotating turbine blade rows which are alternately interdigitized and serve to rotate counter-rotating first and second driveshafts, respectively. The fan section includes counter-rotating spaced apart fan blade sections which are respectively connected to the first and second driveshafts.

U.S. Patent Application Publication No. 2006/0090451, published on May 4, 2006 to Moniz et al., provides a counter-rotating gas turbine engine in which a first fan assembly includes a plurality of rotor blades that are configured to rotate in a first rotational direction at a first rotational speed and a second fan assembly including a plurality of rotor blades that are configured to rotate in a second rotational direction. A gearbox is coupled to the second fan assembly which is configured to rotate the second fan assembly at a second rotational speed that is different than the first rotational speed.

U.S. Patent Application Publication No. 2011/0000222, published on Jan. 6, 2011 to Black et al., provides a rotor stator support system for a gas turbine. The system includes at least one support leg in operable communication with a bearing of the rotor and with the support base. There is at least one strut in communication with the support leg and with the stator.

U.S. Patent Application Publication No. 2013/0223993, published on Aug. 29, 2013 to Merry et al., teaches a gas turbine engine that includes a shaft that defines an axis of rotation. An outer rotor directly drives the shaft and includes an outer set of blades. An inner rotor has an inner set of blades interspersed with the outer set of blades. The inner rotor is configured to rotate in an opposite direction about the axis of rotation from the outer rotor. A gear system couples the inner rotor to the shaft and is configured to rotate the inner set of blades at a faster speed than the outer set of blades.

U.S. Pat. No. 9,410,430, issued on Aug. 9, 2016 to the present inventor, teaches a turbine apparatus with counter-rotating blades. In particular, FIG. 1 herein shows this turbine apparatus. Referring to FIG. 1 herein, there shown the turbine apparatus 10 in accordance with the present invention. The turbine apparatus 10 includes a first set of blades 12, a second set of blades 14, a main shaft 16, a barrel 18, and an outer shell 20. In FIG. 1, it can be seen that the first set of blades 12 is directly mounted to the main shaft 16. The second set of blades 14 is directly mounted, at a periphery thereof, to the barrel 18 or the housing. The main shaft 16 extends centrally through the first set of blades 12 and the second set of blades 14. The main shaft 16 is not connected to the second set of blades 14. In the preferred embodiment the present invention, the second set of blades 14 will rotate in a direction opposite to the second set of blades 12 and to the direction of rotation of the main shaft 16. As a result, the barrel 18 will rotate in a direction opposite to the rotation of the main shaft 16.

In FIG. 1, it can be seen that there is a third set of blades 22 that is affixed to the main shaft 16. The third set of blades 22 extends in generally parallel relationship to the first set of blades 12. The second set of blades 14 is positioned between the first set of blades 12 and the second set of blades 14. There is a fourth set of blades 24 that is mounted, at the periphery thereof, to the barrel 18. As such, when the first of blades 12 and the third set of blades 22 rotate with the rotation of the main shaft 16, the second set of blades 14 and the fourth set of blades 24 will rotate in the opposite direction.

A fluid inlet 26 is directed toward the first set of blades 12 within the interior of the barrel 18. The fluid inlet 26 includes a nozzle 28 for directing the fluid into the interior of the barrel 18 and toward the first set of blades 12. The injection of the fluid through the fluid inlet 26 will impart rotational movement to the first set of blades 12. The direction of the blades within the first set of blades 12 will impart an opposite directional movement to the second set of blades 14 such that the barrel 18 will rotate in the opposite direction. The orientation of the blades of the second set of blades 14 will be directed to the third set of blades 22 so as to further direct rotational energy toward the third set of blades 22. Similarly, the orientation of the blades in the third set of blades 22 is directed to the fourth set of blades 24 so as to further enhance the torque applied by the fourth set of blades 24 to the barrel 18.

The shaft 16 is mounted within bearings and supported by a bearing pedestal 30. The bearing pedestal 30 can be supported upon an underlying surface, such as a floor or deck. The bearing supports the main shaft 16 in a rotatable configuration. The rotatable shaft 16 can extend for use exterior of the turbine apparatus 10. For example, the main shaft 16 can extend so as to be linked to a power source, such as an electrical generator, a boiler feed pump, a compressor, a water pump, a hydraulic unit, or other systems that can utilize rotational energy.

The outer shell 20 extends around the exterior of the barrel 18. As such, the interior of the outer shell 20 is sufficiently sealed so as to avoid loss of pressurized fluid and friction with exterior elements.

As will be described hereinafter, the rotating barrel 18 can be suitably coupled to allow for the rotation of another shaft or to facilitate the rotation of the main shaft 16. For example, the rotating barrel 18 can be coupled by a gear arrangement to another shaft located adjacent to the main shaft 16. Alternatively, a planetary gear arrangement can be coupled between the barrel 18 in the main shaft 16 such that rotational energy of the barrel 18 can be delivered to the main shaft. Still further and alternatively, various rollers, or other connecting devices, can be coupled to the barrel 18 such that the rotating energy of the barrel 18 can be delivered for external use.

Upon experimentation with the configuration of U.S. Pat. No. 9,410,430, it was found that it was important to provide a proper transmission system whereby the rotational energy of the counter-rotating blades can be transmitted to an external power receiver. Additionally, it was found that since the turbines or compressors generate a significant amount of force upon the blades, a configuration of thrust bearings is necessary so as to resist the deflection caused by this force. Additionally, it was found necessary to configure a system whereby the transmission system maximizes the amount of energy that can be transmitted from the counter-rotating blades of the compressor or turbine to a generator and/or a pump.

It is an object of the present invention to provide a turbine apparatus that utilizes a greater percentage of the energy of the working fluid.

It is another object of the present invention to provide a turbine that is suitable for powering boiler feed pumps, auxiliary pumps, hydraulics, electrical generators, as well as items connected to the main shaft.

It is another object of the present invention to provide it transmission system that is able to couple the energy from the counter-rotating blades to an external power receiver, such as a generator or a pump.

It is still another object of the present invention provide a power transmission system that effectively maximizes the amount of power that can be delivered by the counter-rotating blades.

These and other objects and advantages of the present invention will become apparent from a reading of the attached specification and appended claims.

BRIEF SUMMARY OF THE INVENTION

The present invention is a power transmission apparatus that comprises a housing, a first shaft rotatably mounted within the housing, a second shaft rotatably mounted within the housing and extending around at least a portion of the first shaft, a third shaft exterior of the first and second shafts and positioned within the housing, a first transmission connected to the second shaft and to the third shaft such that a rotation of the second shaft causes a rotation of the third shaft, a second transmission connected to the first shaft and to the third shaft such that a rotation of the first shaft applies rotational energy to the third shaft, and a power receiver connected to the third shaft so as to convert the rotational energy of the third shaft into energy or motion.

The first shaft extends entirely through the second shaft so as to have another portion extending outwardly of an end of the second shaft. The second transmission is connected to this another portion. The first shaft rotates in a direction opposite to the direction of the second shaft.

The second transmission includes a first gear affixed to this another portion of the first shaft, a second gear affixed to the third shaft, and a idler gear position between the first and second gears so as to convert the direction of rotation of the first shaft into an opposite direction of rotation of the third shaft. The idler is, in particular, an idler gear having teeth meshed with teeth of the first and second gearboxes. The first transmission includes a first gear affixed to the second shaft and a second gear affixed to the third shaft. A turbine or compressor can be connected to the first shaft. Similarly, another turbine or compressor can be connected to the second shaft.

The second shaft has an end positioned within the housing. A first thrust bearing bears against the end of the second shaft. A second thrust bearing bears against a surface of the second shaft. The second thrust bearing is positioned within the housing. Each of the first and second transmissions can include gears, belts, chains and cog belts.

In an alternative embodiment of the present invention, a fourth shaft can extend over the another portion of the first shaft. The first shaft is linked to the fourth shaft such that the rotation of the first shaft causes a corresponding rotation of the fourth shaft. The second transmission extends between the fourth shaft and the third shaft. A thrust support bears against an end of the second shaft and against an end of the fourth shaft. This thrust support is positioned in the housing.

In the present invention, the power receiver can be a generator, a pump, a turbine, or a compressor.

This foregoing Section is intended to describe, with particularity, the preferred embodiments of the present invention. It is understood that modifications to this preferred embodiments can be made within the scope of the present invention. As such, this Section should not to be construed, in any way, as limiting of the broad scope of the present invention. The present invention should only be limited by the following claims and their legal equivalents.

DETAILED DESCRIPTION OF THE INVENTION

Figure 1:
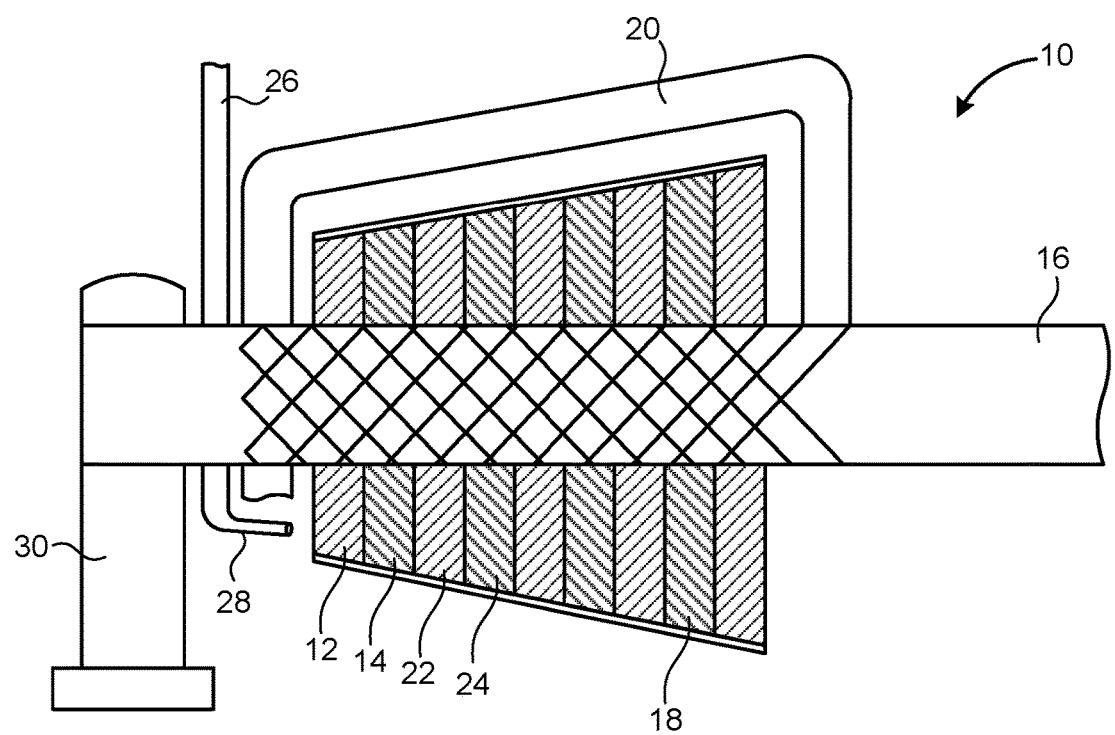
FIG. 1 is a cross-sectional view showing the compressor or turbine with counter-rotating blades in accordance with U.S. Pat. No. 9,410,43 to the present inventor.
Figure 2:
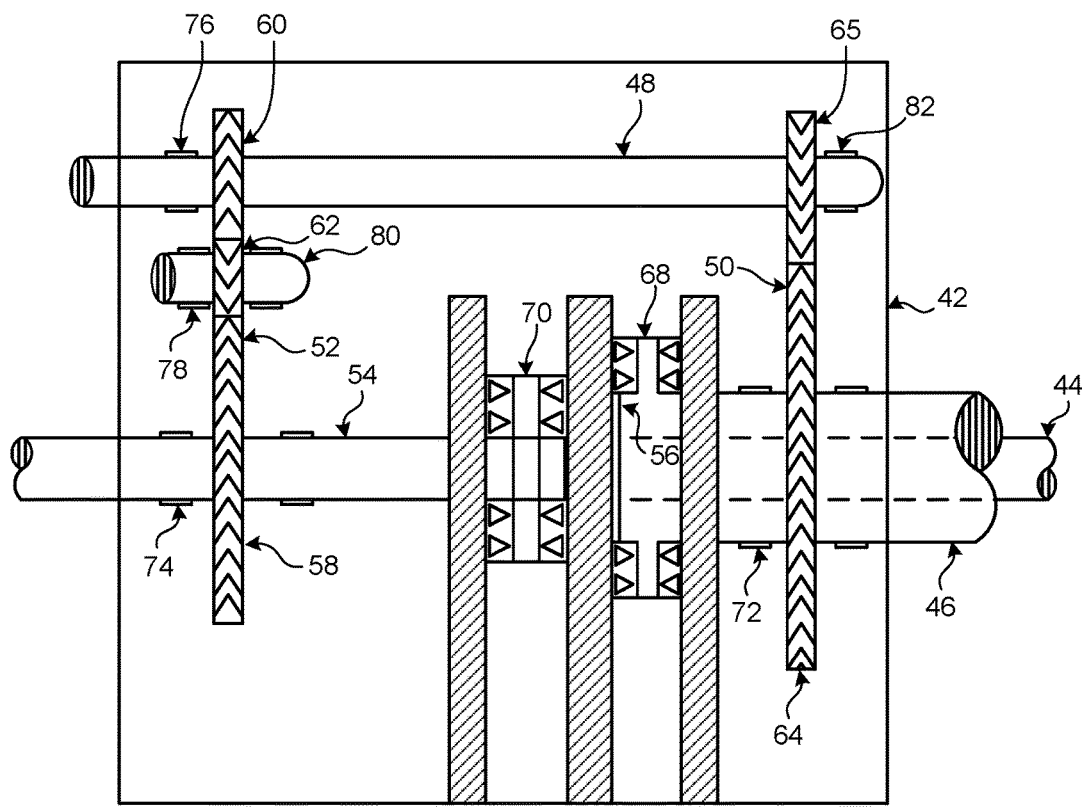
FIG. 2 is a cross-sectional view showing the configuration of the power transmission system of the present invention.

FIG. 2 shows the power transmission system 40 in accordance with the teachings of the present invention. The power transmission system 40 includes a housing 42, a first shaft 44 rotatably mounted within the housing 42, a second shaft 46 rotatably mounted within the housing 42, a third shaft 48 positioned exterior of the first shaft 44 and the second shaft 46 and rotatably mounted within the housing 42, a first transmission 50 connected to the second shaft 46 and to the third shaft 48 such that a rotation of the second shaft 46 causes a rotation of the third shaft 48, and a second transmission 52 connected to the first shaft 44 and to the third shaft 48 such that a rotation of the first shaft 44 applies rotational energy to the third shaft 48. The ends of the first shaft 44 and the second shaft 46 can be connected to the counter-rotating blades of the compressor or turbine of FIG. 1. A power receiver can be connected to the end of the third shaft 48 so as to convert the rotation of the energy of the third shaft 48 into energy or motion. In particular, the power receiver can be in the nature of a generator and/or a pump.

In FIG. 2, it can be seen that the first shaft 44 extends entirely through the second shaft 46 so as to have another portion 54 extending outwardly of an end 56 of the second shaft 46. The second transmission 52 is connected to this portion 54 of the first shaft 44. The first shaft 44 will rotate in a direction opposite to the direction of the second shaft. As such, a particular type of transmission is required so as to transmit the rotational energy of the first shaft into the third shaft 44 such that power is supplied so as to rotate the third shaft 48 by both the first transmission 50 and the second transmission 52 which, respectively, extend from the second shaft 46 and the first shaft 44.

In FIG. 2, the second transmission 52 includes a first gear 58 which is affixed to the portion 54 of the first shaft 44, a second gear 60 that is affixed to the third shaft 48, and an idler gear 62 which is positioned between the first gear 58 and the second gear 60 so as to convert the direction of rotation of the first shaft 44 into an opposite direction of rotation of the third shaft 48.

The first transmission 50 has a first gear 64 that is affixed to the second shaft 46 and a second gear 66 that is affixed to the third shaft 48. The teeth of the gears 64 and 66 mesh so as to transfer rotational energy from the second shaft 46 to the third shaft 48.

Since there is a significant amount of force applied to the blades in the compressor or turbine of FIG. 1, it is important to be able to resist such forces within the interior of the housing 42. As such, there is a first thrust bearing 68 which bears against the end 56 of the second shaft 46. There is another set of thrust bearings 70 that bear against a surface of the first shaft 44.

So as to facilitate the rotation of the first shaft 44 and the second shaft 46, there are shaft bearings applied within the interior of the housing 42. A first shaft bearing 72 will extend around the outer diameter of the shaft 46 in a location between the first transmission 50 and the thrust bearings 68. Another shaft bearing 74 is positioned around the exterior diameter of the first shaft 44 in a location outwardly of the second transmission 52. Another shaft bearing 76 is positioned around the exterior diameter of the third shaft 48 to the side of the second transmission 52. Another shaft bearings 78 is applied around the idler shaft 80. Another shaft bearing 82 is applied around the exterior diameter of the third shaft 48 in a location on the side of the first transmission 50 opposite to the second transmission 60. The shaft bearings facilitate the rotation of each of the shafts and maintain the shafts in a proper position within the interior of the housing 42.

Figure 3:
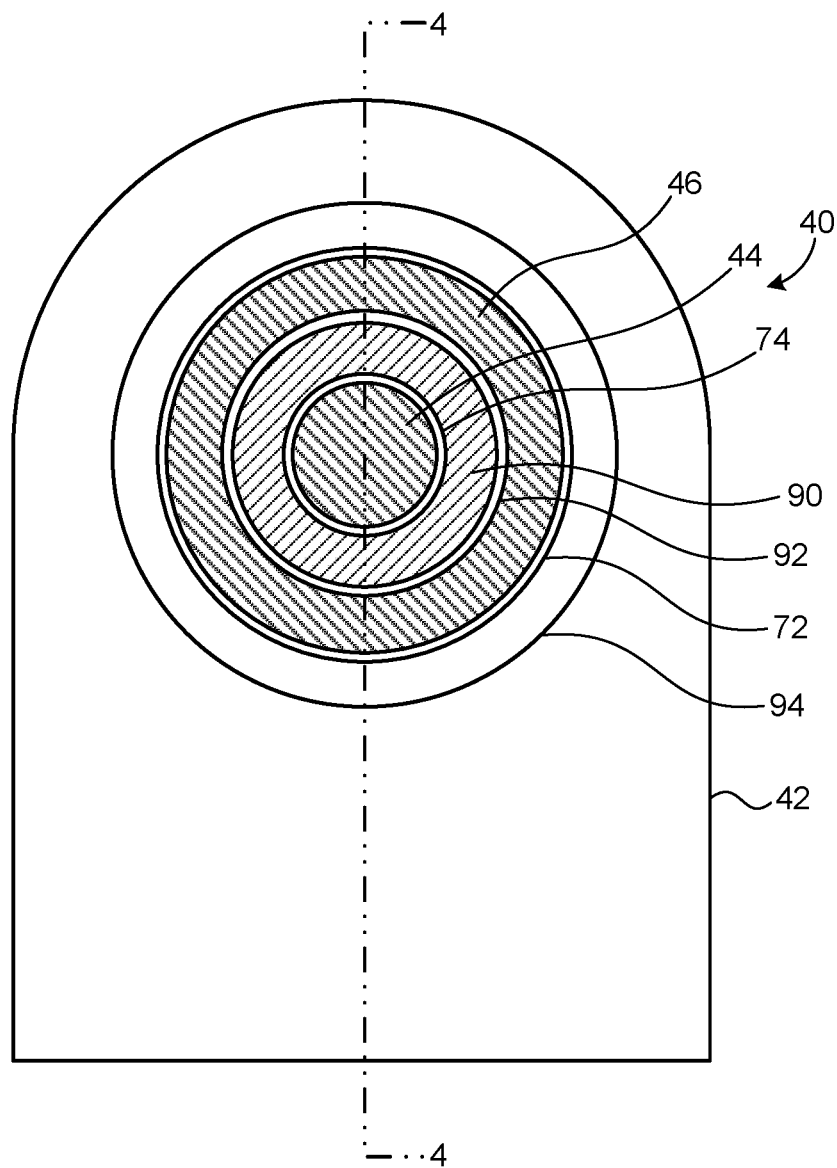
FIG. 3 is a cross-sectional view showing the relationship between the first shaft and the second shaft within the housing of the present invention.

FIG. 3 shows the configuration of the first shaft 44 and the second shaft 46 within the interior of the housing 40. In particular, it can be seen that the shaft bearing 74 extends around the outer diameter of the first shaft 44. The internal bearing support 90 will extend around the outer diameter of the shaft bearing 74. An inner bushing 92 is shown is positioned around the outer diameter of the bearing support 90. The second shaft 46 is shown on an exterior of the bushing 92. The shaft bearing 72 for the second shaft 46 extends around the outer diameter of the second shaft 46. The shaft bearing 72 provides support between the second shaft 46 and the opening 94 of the housing 42.

Figure 4:
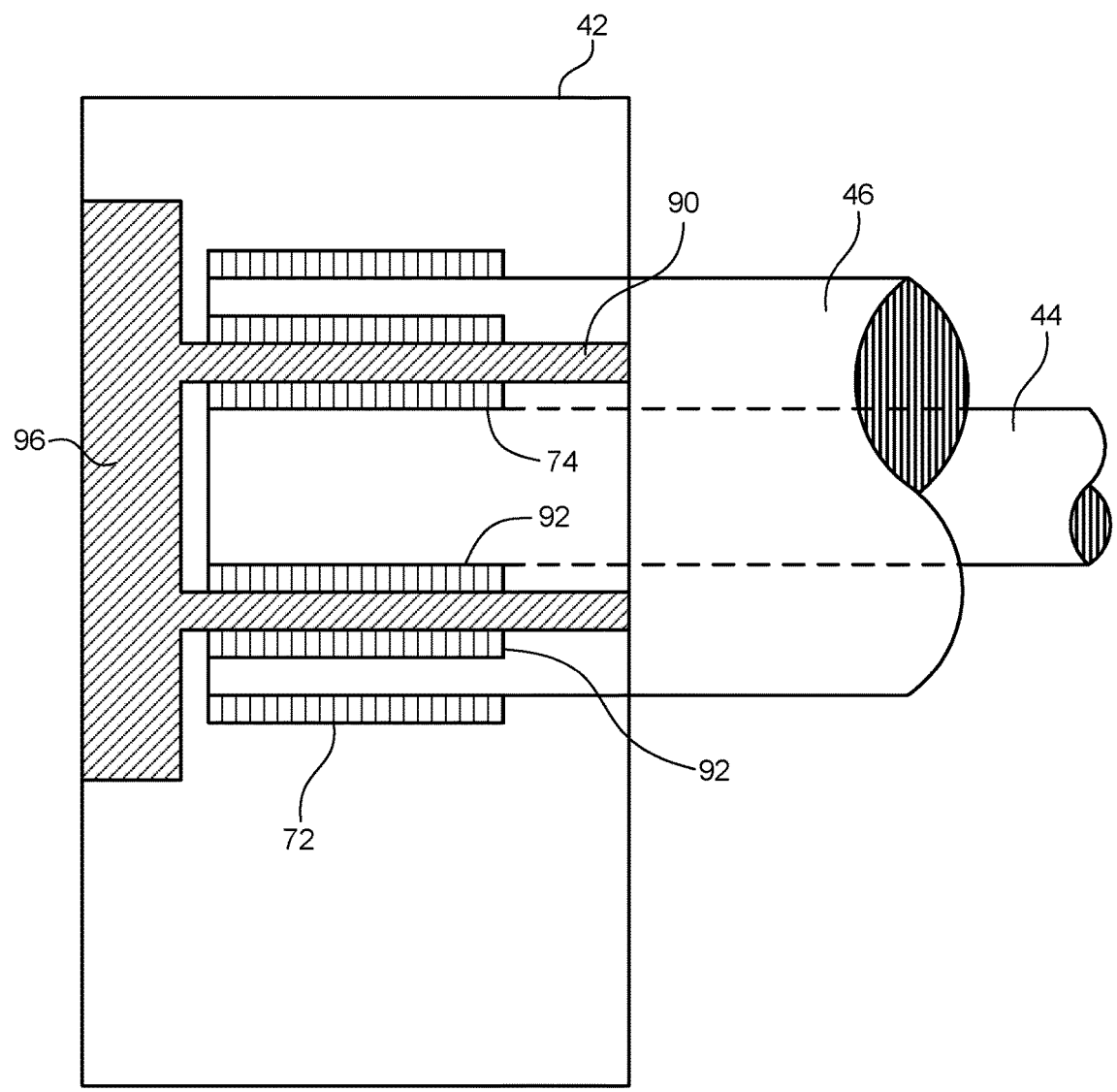
FIG. 4 is a cross-sectional view taken across lines 4-4 of FIG. 3.

FIG. 4 shows that there is a radial support 96 positioned in the housing 42. The bearing support 90 extends outwardly of the radial support 96. The first shaft bearing 74 is interposed between the bearing support 90 and the outer diameter of the first shaft 44. The bushing 92 extends over the bearing support 90. The bushing 92 bears against an inner diameter of the second shaft 46. The shaft bearing 72 extends around the outer diameter of the second shaft 46. The radial support 96, along with the arrangement of bearings and bearing supports resists any forces that are applied to the counter-rotating blades in the turbine or compressor blades that are connected to the shafts 44 and 46. The bearing support 90 and the radial support 96 can be integral and formed from a single machining.

Figure 5:
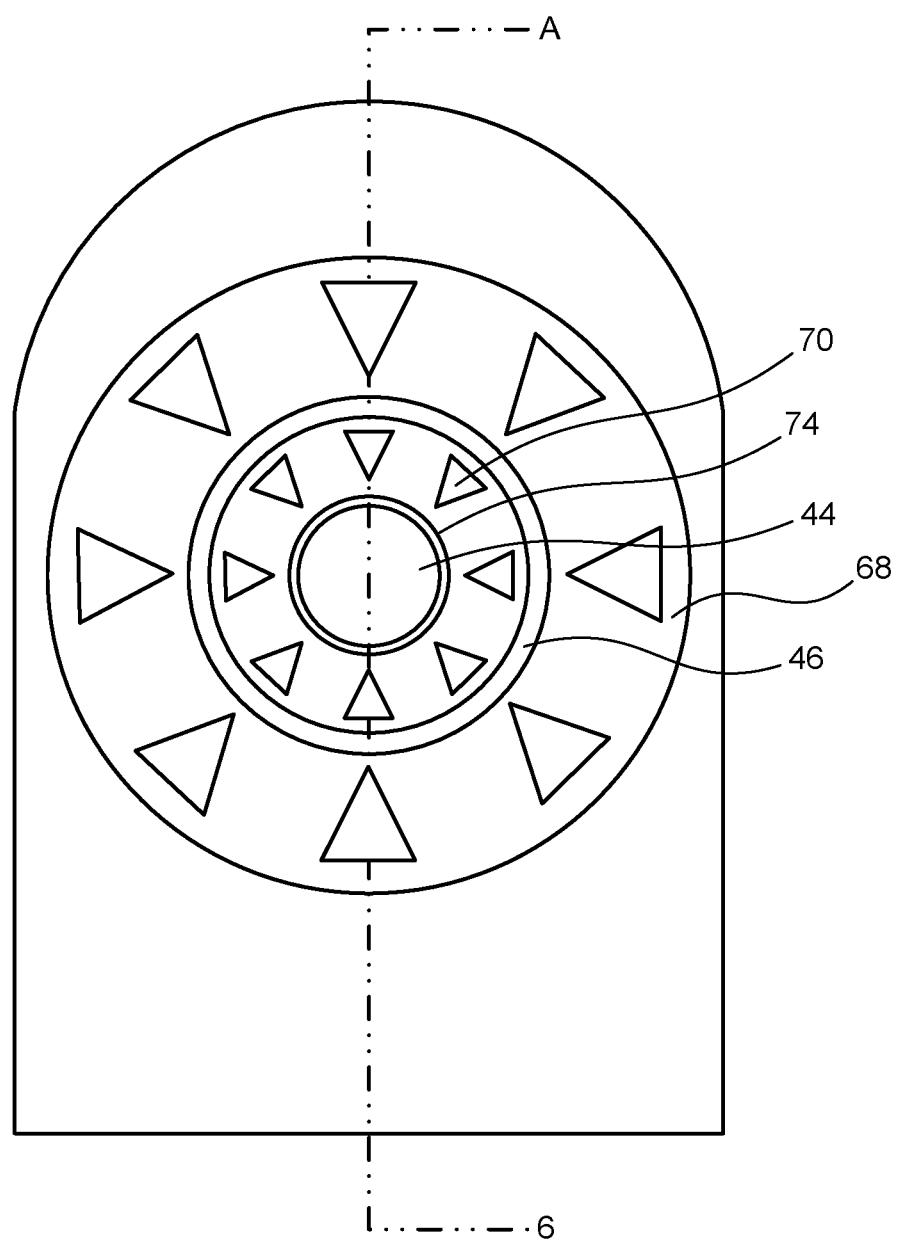
FIG. 5 is a cross-sectional end view showing the arrangement of thrust bearings as used with the first and second shafts of the present invention.

FIG. 5 shows the configuration of the various thrust bearings in relation to the shafts 44 and 46. The shaft bearing 74 extends around the first shaft 44. Thrust bearing 70 will bear against a surface of the first shaft 44 and extend therearound. The thrust bearing 70 can be located in interior of the second shaft 46. The thrust bearing 68 will extend so as to bear against the end of the second shaft 46 and is illustrated as extending therearound. As such, the first shaft 44 and the second shaft 46 are free to rotate in relation to the thrust bearings at the same time that the thrust bearings resist deflection forces upon the shafts 44 and 46.

Figure 6:
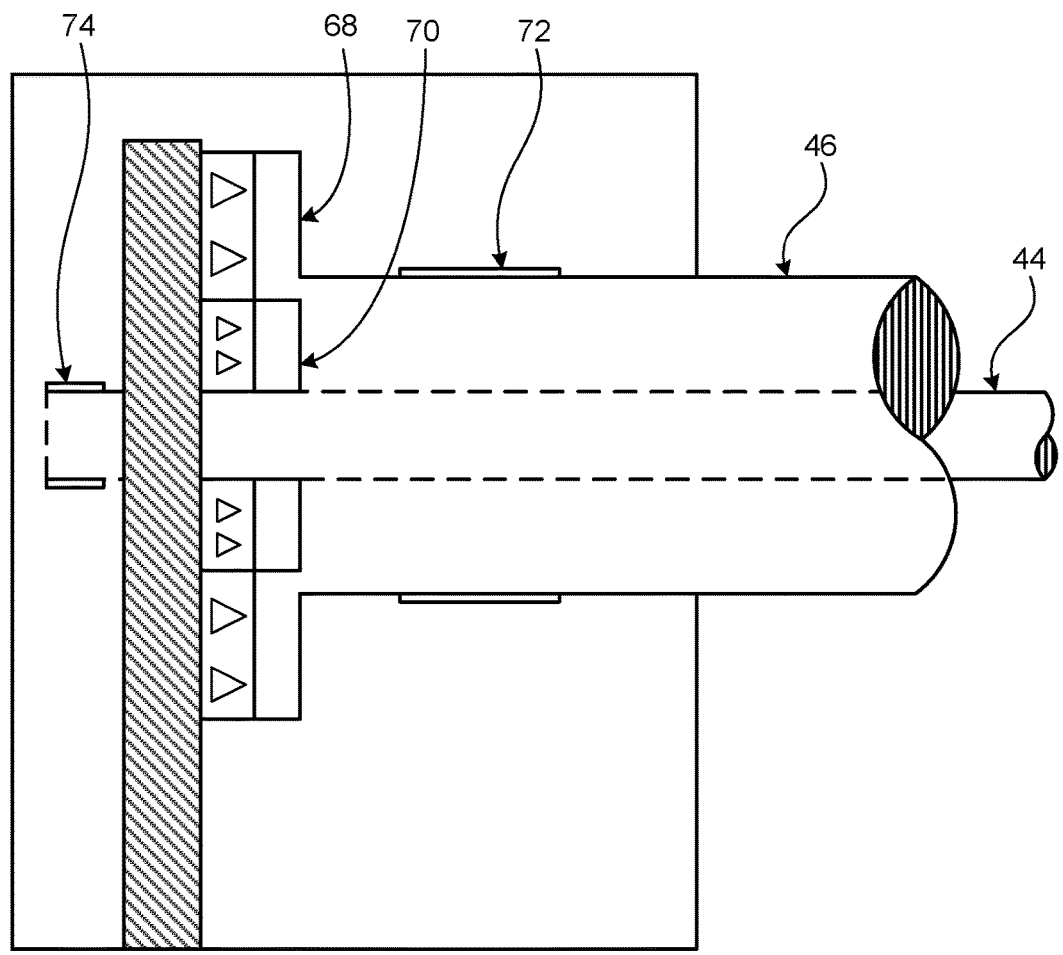
FIG. 6 is a cross-sectional view as taken across lines 6-6 of FIG. 5.

FIG. 6 shows the arrangement of the thrust bearings in relation to the shafts. In particular, thrust bearing 70 bears against a surface of the first shaft 44 within the interior of the second shaft 46. The thrust bearing 68 will bear against the end of the second shaft 46. Shaft bearing 74 extends around the outer diameter of the first shaft 44. Shaft bearing 72 extends around the outer diameter of the second shaft 46.

Figure 7:
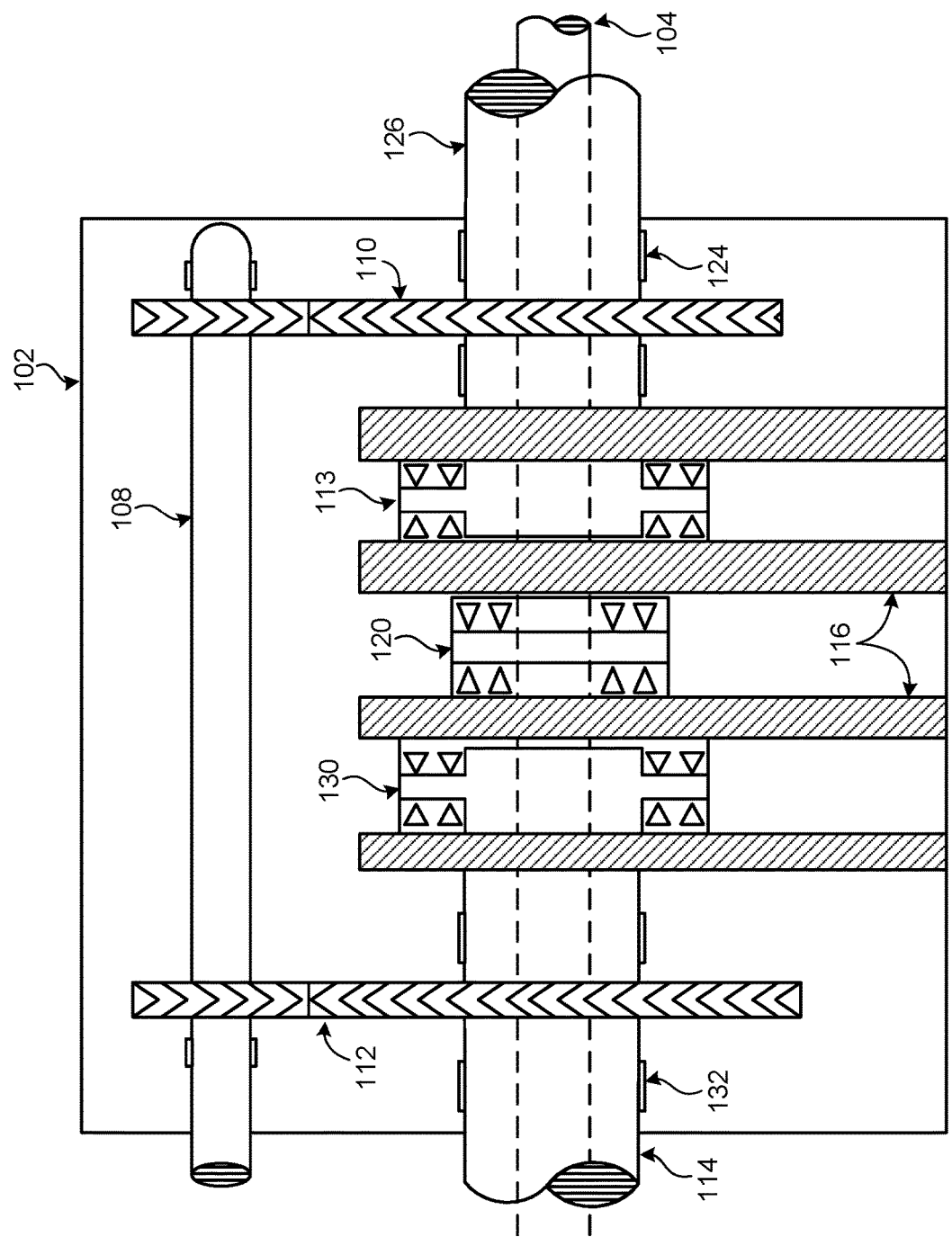
FIG. 7 is a cross-sectional view showing an alternative embodiment of the power transmission system of the present invention.

FIG. 7 shows an alternative embodiment of the power transmission system 100 in accordance with the teachings the present invention. The power transmission system 100 includes a housing 102, a first shaft 104, a second shaft 106, and a third shaft 108. A first transmission 110 extends between the second shaft 106 and the third shaft 108. A second transmission 112 extends between the first shaft 104 and the third shaft 108. Importantly, in the present invention, there is a fourth shaft 114 that extends over the first shaft 104 in spaced relation to the second shaft 106 and axially aligned with the second shaft 106. The second transmission 112 is connected to the fourth shaft 114 and to the third shaft 108. The first shaft 104 is linked to the fourth shaft 114 so as to convert rotational energy of the first shaft 104 into rotational energy of the fourth shaft 114.

A thrust support 116 is positioned generally centrally within the housing 102. In particular, thrust bearing 118 is affixed to one side of the thrust support 116. Similarly, thrust bearing 120 is affixed to the thrust support 116. The thrust support 116 includes an extension 122 which is interposed between the thrust bearings 118 and the thrust bearings 120. The thrust bearings 120 bear against a surface of the first shaft 108. The thrust bearings 118 bear against a surface of the second shaft 106. Ultimately, it can be seen that the end of the second shaft 116 is positioned at the side of the thrust support 116. A shaft bearing 124 extends around the second shaft 106 so as to facilitate the rotation and positioning of the second shaft 106.

The fourth shaft 114 also has an end that bears against the thrust support 106. Thrust bearings 130 extend around the outer diameter of the fourth shaft 114 and are affixed against the thrust support 116. A shaft bearing 132 surrounds the outer diameter of the fourth shaft 114 so as to facilitate the rotation and positioning of the fourth shaft 114. It can be seen that the first shaft 104 extends entirely through the second shaft 116, through the thrust support 116 and through the interior of the fourth shaft 114. Ultimately, as described hereinbefore, each of the shafts 104 and 106 can be connected to the counter rotating blades associated with a turbine or compressor of FIG. 1. The third shaft 108 can be connected to a power receiver, such as a generator or a pump. Importantly, if desired, the first shaft 104 can also be connected to a power receiver, such as a generator or a pump. Similarly, the fourth shaft 114 could also be connected to such an apparatus.

The foregoing disclosure and description of the invention is illustrative and explanatory thereof. Various changes in the details of the illustrated construction can be made within the scope of the present claims without departing from the true spirit of the invention. The present invention should only be limited by the following claims and their legal equivalents.

I claim:

1. An apparatus comprising:
   a housing;
   a first shaft rotatably mounted within said housing;

a second shaft rotatably mounted within said housing, said second shaft extending around at least a portion of said first shaft;
a third shaft exterior of said first and second shafts and positioned within said housing;
a first transmission connected to said second shaft and to said third shaft such that a rotation of said second shaft causes a rotation of said third shaft;
a second transmission connected to said first shaft and to said third shaft such that a rotation of said first shaft applies rotational energy to said third shaft; and
a power receiver connected to said third shaft so as to convert the rotational energy of said third shaft into energy or motion.

2. The apparatus claim 1, said first shaft extending entirely through said second shaft so as to have another portion extending outwardly of an end of said second shaft, said second transmission connected to said another portion of said first shaft.

3. The apparatus claim 2, said first shaft rotating in a direction opposite to a direction of rotation of said second shaft.

4. The apparatus claim 3, said second transmission comprising:
a first gear affixed to said another portion of said first shaft;
a second gear affixed to said third shaft; and
an idler gear positioned between said first and second gears so as to convert the direction of rotation of said first shaft into an opposite direction of rotation of said third shaft.

5. The apparatus of claim 4, said idler being an idler gear having teeth meshed with teeth of said first and second gears.

6. The apparatus of claim 1, said first transmission comprising:
a first gear affixed to said second shaft; and
a second gear affixed to said third shaft.

7. The apparatus of claim 1, further comprising:
a first turbine or compressor connected to said first shaft; and
a second turbine or compressor connected to said second shaft.

8. The apparatus of claim 1, said second shaft having an end within said housing, the apparatus further comprising:
a first thrust bearing bearing against said end of said second shaft.

9. The apparatus of claim 8, the apparatus further comprising:
a second thrust bearing bearing against a surface of said first shaft, said second thrust bearing positioned within said housing.

10. The apparatus of claim 1, each of said first and second transmissions selected from the group consisting of gears, belts, chains and cog belts.

11. The apparatus of claim 1, further comprising:
a fourth shaft extending over said another portion of said first shaft, said first shaft being linked to said fourth shaft such that the rotation of said first shaft causes a corresponding rotation of said fourth shaft.

12. The apparatus of claim 11, said second transmission extending between said fourth shaft and said third shaft.

13. The apparatus of claim 12, further comprising:
a thrust support bearing against an end of said second shaft and against an end of said fourth shaft, said thrust support positioned in said housing.

14. The apparatus of claim 1, said power receiver selected from the group consisting of a generator, a pump, a turbine, and a compressor.

15. A power transmission apparatus comprising:
a first shaft rotatably mounted within said housing;
a second shaft rotatably mounted within said housing, said second shaft extending around at least a portion of said first shaft;
a third shaft exterior of said first and second shafts and positioned within said housing;
a first transmission connected to said second shaft and to said third shaft such that a rotation of said second shaft causes a rotation of said third shaft; and
a second transmission connected to said first shaft and to said third shaft such that a rotation of said first shaft applies rotational energy to said third shaft, said first shaft extending entirely through said second shaft so as to have another portion extending outwardly of an end of said second shaft, said second transmission connected to said another portion, said first shaft rotating the direction opposite to a rotation of said second shaft.

16. The power transmission apparatus of claim 15, further comprising:
a housing receiving a portion of said first shaft and a portion of said second shaft and said third shaft therein; and
a power receiver connected to said third shaft so as to convert the rotational energy of said third shaft into energy or motion.

17. The power transmission apparatus of claim 15, said second transmission comprising:
a first gear affixed to said another portion of said first shaft;
a second gear affixed to said third shaft; and
an idler gear position between said first and second gears so as to convert the direction of rotation of said first shaft into an opposite direction of rotation of said third shaft.

18. The power transmission apparatus of claim 15, said first transmission comprising a first gear affixed to said second shaft; and
a second gear affixed to said third shaft.

19. The power transmission apparatus of claim 15, further comprising:
a first turbine or compressor connected to said first shaft; and
a second turbine or compressor connected to said second shaft.

20. The power transmission apparatus of claim 15, said second shaft having an end within said housing, the apparatus further comprising:
a first thrust bearing bearing against said end of said second shaft; and
a second thrust bearing bearing against a surface of said first shaft.

* * * * *